J. BAKER.
DETACHABLE SECURING MEANS FOR TIRES.
APPLICATION FILED FEB. 14, 1907.
913,253.
Patented Feb. 23, 1909.
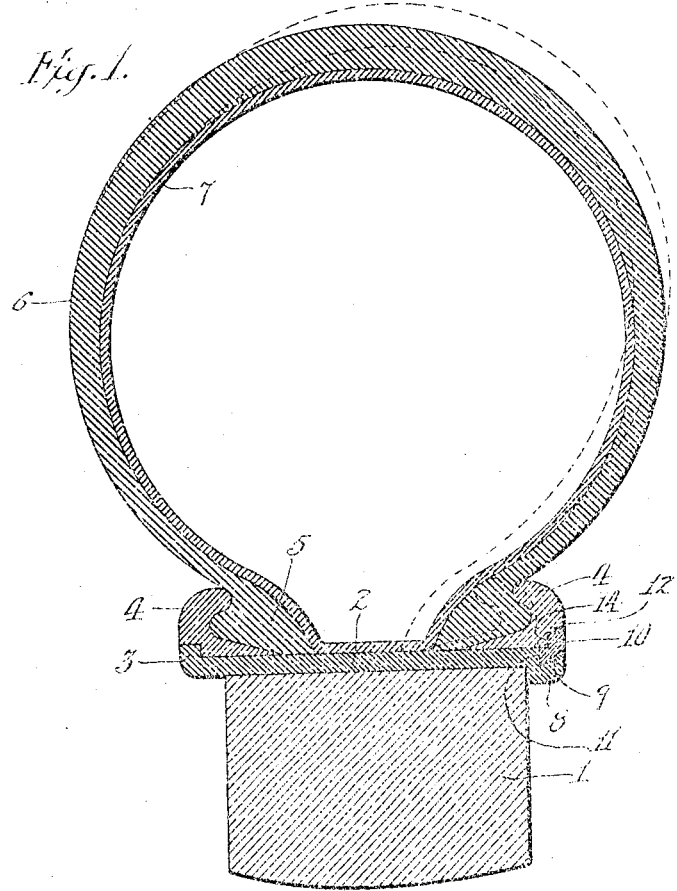
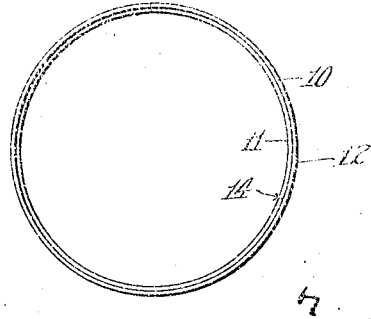
Witnesses:
Inventor:
John Baker

UNITED STATES PATENT OFFICE.

JOHN BAKER, OF PASADENA, CALIFORNIA.

DETACHABLE SECURING MEANS FOR TIRES.

No. 913,253.

Specification of Letters Patent.

Patented Feb. 23, 1909.

Application filed February 14, 1907. Serial No. 357,414.

*To all whom it may concern:*

Be it known that I, JOHN BAKER, a citizen of the United States, residing at Pasadena, in the county of Los Angeles and State of California, have invented new and useful Improvements in Detachable Securing Means for Tires, of which the following is a specification.

The invention relates to detachable securing means for tires, and the objects of the invention are to provide means for detachably securing the tire to the wheel which is simple in construction, economical of manufacture, and which does not depend for its operation upon bolts, screws, pins, keys, or the like. I am aware that a device of this general nature is not generically new, and I therefore do not claim such general type of construction broadly, as my present application relates to an improvement in that type of devices which will hold the tire securely in place, even though the tire becomes considerably relaxed.

The accompanying drawings illustrate the invention and referring thereto:—Figure 1 is a cross section through a tire and a wheel felly equipped with one form of the invention. Fig. 2 is a plan view of the locking ring for securing the parts together.

1 designates the felly of the vehicle wheel to which felly is secured a rim 2, formed preferably of metal, and having at one edge a flange 3 against which is seated a retaining ring 4 which interlocks with an enlargement 5 at the inner edge of the tire 6. 7 designates the inner air tube of the tire. The other edge of the rim 2 has a thick inwardly projecting flange 8 which abuts against the edge of the felly 1, the flange 8 being provided with an annular groove 9. Another retaining ring 4 is mounted on the edge of the rim 2 adjacent the flange 8 and interlocks with the adjacent enlargement 5 of the tire 6. In the present drawings I have shown the retaining rings 4 as duplicates of each other and interchangeable. The retaining ring 4 adjacent the flange 8 is locked in position by a split locking ring 10, shown in detail in Fig. 2, which locking ring is L-shaped in cross section, thus having two annular leaves or flanges at right angles to each other, one of which flanges 11 is beveled or inclined upon its inner circumferential face and seats in the groove 9 of the rim 2, said seat being correspondingly inclined while the other flange 12 is formed with its outer face shouldered as shown at 14 to conform to a correspondingly shaped seat or recess in the retaining ring 4. The split locking ring 10 has a natural tendency to close its two ends together as shown in Fig. 2, and to place it in position engaging in the groove 9, the retaining ring 4 is pushed toward the center of the rim 2 as indicated in dotted lines in Fig. 1 until the outer edge of the retaining ring 4 fully clears the groove 9 in rim 2, whereupon the split locking ring 10 may be sprung apart slightly to slip over the outer diameter of the rim and moved in until its flange 11 registers with the groove 9, whereupon the locking ring contracts, springing its flange 11 into the groove 9, the ends of the locking ring then closing so that it forms a complete circle. The retaining ring 4 is then moved outward until stopped by the locking ring and the pressure of the tire holds the retaining ring 4 outwardly against the locking ring. It will be noted that in order to release the tire it must first be deflated to permit it to be moved a considerable distance, as indicated by dotted lines, to permit the necessary inward movement of the retaining ring 4 to enable the locking ring 10 to be withdrawn, and therefore a slight yielding of the tire is insufficient to accomplish this releasing function, and this feature is one of decided advantage in preventing accidental detachment of the tire. By constructing the groove 9 with an inclined seat and the locking ring 10 with an inclined face in this manner it is evident that the ring can be inserted or removed with a much less inward movement of the retaining ring 4 than where the retaining ring is provided with a flange and the rim with a groove for receiving it.

What I claim is:—

A rim having a groove at one edge, the bottom of the groove being inclined and extending from the outer edge of the rim inward and downward and the inner wall extending at an acute angle thereto to the periphery of the rim, a retaining ring on the rim having a groove in its inner face, the inner wall of which groove is normally at a point nearer the outer edge of the rim than the inner wall of said groove and the other wall is at right angles thereto, and a split locking ring in said grooves, the inner circumferential face of which is beveled to fit within the inclined bottom of the groove in the rim and the inner annular face is grooved circumferentially to engage with the grooved portion of the retaining ring and be retained thereby in the groove in the rim.

In testimony whereof, I have hereunto set my hand at Los Angeles California this 9th day of February 1907.

JOHN BAKER.

In presence of—
GEORGE T. HACKLEY,
FRANK L. A. GRAHAM.